(12) United States Patent
Wen et al.

(10) Patent No.: US 11,676,257 B2
(45) Date of Patent: Jun. 13, 2023

(54) METHOD AND DEVICE FOR DETECTING DEFECT OF MEAL BOX, SERVER, AND STORAGE MEDIUM

(71) Applicant: BEIJING BAIDU NETCOM SCIENCE AND TECHNOLOGY CO., LTD., Beijing (CN)

(72) Inventors: Yawei Wen, Beijing (CN); Jiabing Leng, Beijing (CN); Minghao Liu, Beijing (CN); Yulin Xu, Beijing (CN); Jiangliang Guo, Beijing (CN); Xu Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 114 days.

(21) Appl. No.: 16/697,944

(22) Filed: Nov. 27, 2019

(65) Prior Publication Data
US 2020/0175673 A1    Jun. 4, 2020

(30) Foreign Application Priority Data
Nov. 30, 2018    (CN) .......................... 201811458919.X

(51) Int. Cl.
*G06T 7/00*     (2017.01)
*B65B 25/00*    (2006.01)
*G06N 3/08*     (2023.01)

(52) U.S. Cl.
CPC .......... *G06T 7/0004* (2013.01); *B65B 25/001* (2013.01); *G06N 3/08* (2013.01);
(Continued)

(58) Field of Classification Search
CPC ..... G06T 7/001; G06T 7/0012; G06T 7/0014; G06T 2207/10004; G06T 2207/20081;
(Continued)

(56) References Cited

U.S. PATENT DOCUMENTS 10,346,969 B1 *  7/2019  Raghu .................. G06T 7/0004
10,783,406 B1 *  9/2020  Ye ........................ G06K 9/6278
(Continued)

FOREIGN PATENT DOCUMENTS

CN    108257121 A    7/2018
CN    108320278 A    7/2018
(Continued)

OTHER PUBLICATIONS

S. Ren, K. He, R. Girshickand J. Sun, "Faster R-CNN: Towards Real-Time Object Detection with Region Proposal Networks," in IEEE Transactions on Pattern Analysis and Machine Intelligence, vol. 39, No. 6, pp. 1137-1149, Jun. 1, 2017, doi: 10.1109/TPAMI.2016.2577031. (Year: 2017).*
(Continued)

*Primary Examiner* — Sean M Conner
*Assistant Examiner* — Stephen M Brinich
(74) *Attorney, Agent, or Firm* — Lippes Mathias LLP

(57) ABSTRACT

Embodiments of the present disclosure provide a method and a device for detecting defect of a meal box, a server, a device, and a storage medium. The method includes: receiving a detection request including an image of the meal box sent by a user terminal, the image of the meal box being obtained by an image acquirer of the user terminal; and performing defect recognition based on the image of the meal box and a defect detection model in response to the detection request.

14 Claims, 6 Drawing Sheets

(52) U.S. Cl.
CPC ............... *G06T 2207/10004* (2013.01); *G06T 2207/20081* (2013.01); *G06T 2207/20084* (2013.01)

(58) Field of Classification Search
CPC ........... G06T 2207/20084; G06T 2207/30108; B65B 25/02; B65B 25/10; B65B 25/12; B65B 25/16; B65B 25/18; B65B 25/22
USPC ......... 382/110, 141–143, 148–149, 151–152
See application file for complete search history.

(56) References Cited

U.S. PATENT DOCUMENTS

| | | | | |
|---|---|---|---|---|
| 2003/0118230 | A1* | 6/2003 | Song | E21B 19/22 382/152 |
| 2012/0057773 | A1* | 3/2012 | Langmatz | G06T 7/001 382/141 |
| 2014/0269815 | A1* | 9/2014 | Sloat | G01N 22/02 374/5 |
| 2016/0258880 | A1 | 9/2016 | Smorgon et al. | |
| 2017/0343481 | A1* | 11/2017 | Jahanshahi | G06T 7/44 |
| 2018/0211373 | A1* | 7/2018 | Stoppa | G06K 9/4628 |
| 2018/0293713 | A1* | 10/2018 | Vogels | G06N 3/04 |
| 2019/0073568 | A1* | 3/2019 | He | G06K 9/6267 |

FOREIGN PATENT DOCUMENTS

| | | | | |
|---|---|---|---|---|
| CN | 108846841 A | 11/2018 | | |
| EP | 3503024 A1 * | 6/2019 | ........... | G06T 7/0004 |

OTHER PUBLICATIONS

Office Action for Chinese Application 201811458919.X, dated Mar. 25, 2020.

* cited by examiner

METHOD AND DEVICE FOR DETECTING DEFECT OF MEAL BOX, SERVER, AND STORAGE MEDIUM

CROSS-REFERENCE TO RELATED APPLICATIONS

This application claims priority to and benefits of Chinese Patent Application No. 201811458919.X, filed with the National Intellectual Property Administration of P. R. China on Nov. 30, 2018, the entire contents of which are incorporated herein by reference.

TECHNICAL FIELD

The present disclosure relates to the field of detection technologies, and more particularly, to a method and device for detecting defect of a meal box, a server, and storage medium.

BACKGROUND

With the rapid development of Internet and communications, catering industry has flourished, the demand for meal boxes is increased, and the quality detection of meal boxes is important.

SUMMARY

Embodiments of the present disclosure provide a method for detecting defect of a meal box, including: receiving a detection request including an image of the meal box sent by a user terminal, and performing defect recognition based on the image of the meal box and a defect detection model in response to the detection request. The image of the meal box is obtained by an image acquirer of the user terminal.

Embodiments of the present disclosure provide a method for detecting defect of a meal box, including: acquiring an image of the meal box by an image acquirer; generating a detection request including the image of the meal box; and transmitting the detection request to a server. The detection request is configured to instruct the server to perform defect recognition based on the image of the meal box and a defect detection model in response to the detection request.

DETAILED DESCRIPTION

Embodiments of the present disclosure will be described in detail below with reference to the accompanying drawings and embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

In the related art, the quality of the appearance of the meal box is generally detected manually or semi-automatically based on optical detection. The manual detection manner mainly relies on quality inspection personnel to observe the appearance photo of the meal boxes through their naked eyes, and give the judgment result by experience. The semi-automatic detection manner mainly relies on a quality inspection system to screen out defect-free meal boxes, and then relies on the quality inspection personnel to detect the appearance photo of the suspected meal box having the defects.

However, the above detection manners are easily affected by subjective factors of the quality inspection personnel, the criteria for defective judgment of the meal box is not unify, and it is easy to damage the eyes of the quality inspection personnel. Moreover, the detection accuracy and detection efficiency are low, and it cannot cover all the detection criteria of the box manufacturer, the expansibility is low.

Embodiment 1

Figure 1:
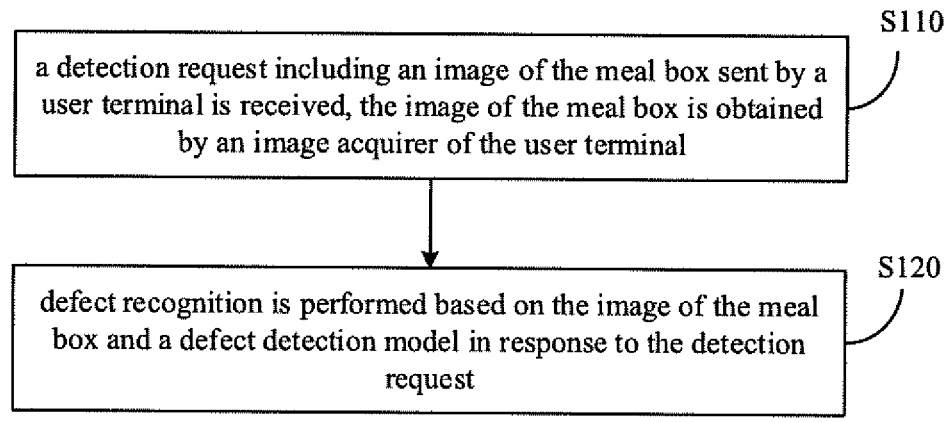
FIG. 1 is a flow chart of a method for detecting defect of a meal box according to Embodiment 1 of the present disclosure.

FIG. 1 is a flow chart of a method for detecting defect of a meal box according to Embodiment 1 of the present disclosure. The embodiment may be applicable to the cases of detecting the quality of the meal box, and the method may be applicable to a server, and can be executed by a device for detecting defect of a meal box. The method may include the followings.

At block S110, a detection request including an image of the meal box sent by a user terminal is received. The image of the meal box is obtained by an image acquirer of the user terminal.

In an embodiment of the present disclosure, the user terminal may be configured to control the production line of the meal box and the image acquisition of the meal box. The user terminal may be provided with an image acquirer, and the image acquirer may be a device capable of acquiring images, such as a camera. A high-precision image acquisition camera may be used for high-precision image acquisition, and by adjusting shooting parameters such as the shooting angle, auxiliary light, filter, scope and focal length, the image of the production line of the meal box can be acquired, such that the image of the meal box can be acquired. The material of the meal box to be detected is not limited, and any meal box may be applied to the embodiment, such as a plastic meal box, a plastic foam meal boxes, a metal meal box, or a glass meal box.

In the embodiment, the user terminal may generate the detection request according to the image of the meal box acquired by the image acquirer, and transmit the detection request to a server, such that the server receives the detection request, and performs defect recognition based on the image of the meal box. The detection request may include the image of the meal box, and the image of the meal box may include one image of the meal box, or may be multiple multi-view images of the meal box.

At block S120, defect recognition is performed based on the image of the meal box and a defect detection model in response to the detection request.

In an embodiment of the present disclosure, a defect detection model may be deployed in the server, and the defect detection model may be configured for defect recognition of the image of the meal box. The same defect detection model may be deployed in different servers, or defect detection models with different detection functions may be deployed in different servers. The defect detection model may be trained by a training engine based on historically labeled sample meal box images and business scenario requirements. For example, the defect type such as scratch, missing, and discoloration of the meal box may be pre-divided, and based on the defect locations and the defect types in the sample meal box images, the neural network model may be trained by using the sample meal box images, so as to obtain the defect detection model. The server may respond to the detection request, and perform defect recognition on the image of the meal box by using the defect detection model mounted thereon, so as to obtain the defect detection result of the image of the meal box. When it is detected that the meal box has a defect, the defect detection result may include parameters such as the defect type and the coordinates of the defect location.

In the embodiment, due to the influence of the imaging device, the imaging technology, and the imaging environment, the data characteristics of the image of the meal box may vary. Thus, before the target server recognizes the image of the meal box, the average value and the standard deviation of values of respective pixels in the image of the meal box may be determined, and normalization process may be performed on the values of respective pixels in the image of the meal box, such that the pixel data of the image of the meal box to be detected can be unified, subsequent standardized defect detection can be facilitated, and detection error can be reduced.

Correspondingly, after defect recognition is performed based on the image of the meal box and the defect detection model in response to the detection request, the server may perform a response behavior on the meal box based on the defect detection result of the image of the meal box and the business scenario requirement.

For example, when it is detected based on the image of the meal box that the meal box has a defect, a defect alarm instruction may be generated according to the recognized defect type and/or the defect location, and the defect alarm instruction may be transmitted to the user terminal to instruct the user terminal to alarm according to the defect alarm instruction, so as to inform the staff that the meal box having the defect is detected, and the defect type and the defect location. Alternatively, a meal box pick-out instruction may be generated according to the recognized defect type, and transmitted to the user terminal, to instruct a robot arm of the user terminal to pick out the meal box, so as to screen out the meal box having the defect. The plastic meal box may also be picked out according to the defect type, such that the staff can handle different types of meal box having the defect. For example, the meal box having the scratch may be remediated and reused.

Data such as the image of the meal box, the defect detection result and the response behavior may be stored in a database, and used to review the accuracy of defect detection and positioning, so as to update the defect detection model. Illustratively, correction information of a result of the defect recognition of the image of the meal box fed back by the staff or the detecting device may be obtained, new defect detection samples may be generated according to the correction information, and the defect detection model can be updated according to the new defect detection samples.

With the technical solution of embodiments of the present disclosure, the detection request including the image of the meal box sent by the user terminal is received, and defect recognition is performed based on the image of the meal box and the defect detection model in response to the detection request. The image of the meal box may be obtained by the image acquirer, the image acquirer may acquire the image of the meal box on the production line in real time, and the detection request may be generated based on the image of the meal box, and transmitted to the server. By detecting the image of the meal box obtained in real time, the defect detection of the meal box on the production line can be realized visually and automatically, and the manual detection of the quality of the meal box can be avoided, such that the efficiency and accuracy of defect detection of the meal box can be improved, and automaticity and expandability of the quality detection of the meal box can be improved.

Embodiment 2

Figure 2:
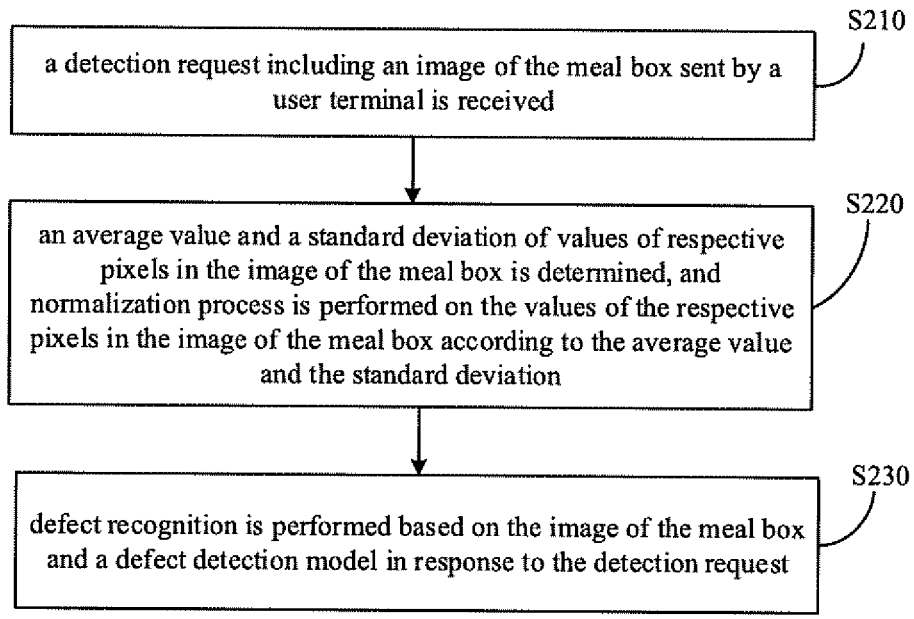
FIG. 2 is a flow chart of a method for detecting defect of a meal box according to Embodiment 2 of the present disclosure.

On the basis of embodiment 1, the present disclose further provide a method for detecting defect of a meal box according to an alternative embodiment. In the embodiment, defect recognition is performed based on the image of the meal box and a defect detection model. FIG. 2 is a flow chart of a method for detecting defect of a meal box according to Embodiment 2 of the present disclosure. As shown in FIG. 2, the method may include the followings.

At block S210, a detection request including an image of the meal box sent by a user terminal is received.

In the embodiment, the user terminal may generate the detection request according to the image of the meal box acquired by the image acquirer, and transmit the detection request to a server, such that the server receives the detection request, and performs defect recognition on the image of the meal box. The detection request may include the image of the meal box, and the image of the meal box may include one image of the meal box, or may be multiple multi-view images of the meal box.

At block S220, an average value and a standard deviation of values of respective pixels in the image of the meal box is determined, and normalization process is performed on the values of the respective pixels in the image of the meal box according to the average value and the standard deviation.

In the embodiment, due to the influence of the imaging device, the imaging technology, and the imaging environment, the data characteristics of the image of the meal box may vary. Thus, before the target server recognizes the image of the meal box, the average value and the standard deviation of values of respective pixels in the image of the meal box may be determined, and normalization process may be performed on the values of respective pixels in the image of the meal box, such that the pixel data of the image of the meal box to be detected can be unified, subsequent standardized defect detection can be facilitated, and detection error can be reduced At block S230, defect recognition is performed based on the image of the meal box and a defect detection model in response to the detection request.

In an embodiment of the present disclosure, a defect detection model may be deployed in the server, and the defect detection model may be configured for defect recognition of the image of the meal box. The defect detection model may be trained by a training engine by using initial meal box images or feature maps as input and based on historically labeled sample meal box images and business scenario requirements, to determine whether the meal box has the defect. When it is detected that the meal box has the defect, the defect type and the coordinates of the defect location may be output.

The training engine may train the defect detection model based on a deep convolution neural network, such as a mask region-based convolutional neural network (R-CNN) instance segmentation algorithm based on faster R-CNN. The deep convolutional neural network may include a convolutional layer, a pooling layer and a fully connected layer. The convolutional layer may be configured to perform convolution on the sample meal box images or the feature map by using convolutional kernels with different functions, extract data features, and output the data features to the feature map. The pooling layer may be configured to perform dimension reduction on the feature map, to retain main features in the feature map. With this deep neural network model, high robustness to deformation, blur and illumination changes of the image of the meal box on the production line can be achieved, and generalization of the classification task can be improved. The fully connected layer may be configured to map the extracted features to a defect location classification network. For different data characteristics of the image of the meal box and production scenes of the meal box, the corresponding deep convolutional neural model of different depths, different numbers of neurons, and different convolutional pooling modes can be designed, to train the defect detection model.

On the basis of the faster R-CNN algorithm, the mask R-CNN algorithm has a network branch for instance segmentation, which can restore the size of the feature map to the size of an initial image and predict the instance of each pixel based on a binary interpolation algorithm. For the prediction result of each pixel, a cross entropy operation may be performed with the real value to obtain a loss, and then training may be performing by combining the loss with the loss of the faster R-CNN, to optimize network model parameters.

The faster R-CNN algorithm may obtain the feature map based on the convolution of the classification model, and then determine whether a preset area of the initial sample meal box image includes a preset meal box by using a region proposal network (RPN). When the preset area of the sample meal box image includes the preset meal box, feature extraction may be performed using a convolutional network to predict the object category and the bounding box, when the preset area of the sample meal box image does not include the preset meal box, classification is not performed. The training is performed based on the losses of three network branches, the model parameters are further be optimized. When the difference between the output value and the true value of the model is less than a predetermined threshold, the training is stopped. The model that is running online can be gradually replaced by the well-trained model in a small flow online manner, such that the model can be generalized with dynamic expansion of the business.

In the embodiment, the same defect detection model may be deployed in different servers, and defect detection models with different detection functions may be deployed in different servers. The server may respond to the detection request, and perform defect recognition based on the image of the meal box and the defect detection model mounted thereon and by using the image of the meal box as the input of the defect detection model, so as to obtain the defect detection result of the image of the meal box. When it is detected based on the image of the meal box that the meal box has the defect, the output result may include parameters such as the defect type and the coordinates of the defect location. Then, the controller may perform a response behavior on the meal box based on the defect detection result of the image of the meal box and the business scenario requirement.

In at least one embodiment, when it is detected that the meal box has the defect, a defect alarm instruction may be generated according to the recognized defect type and/or the defect location, and the defect alarm instruction may be transmitted to the user terminal.

In the embodiment, when it is detected that the meal box has the defect, a defect alarm instruction may be generated according to the recognized defect type and/or the defect location, and the defect alarm instruction may be transmitted to the user terminal to instruct the user terminal to alarm according to the defect alarm instruction, so as to inform the staff that the meal box having the defect is detected, and the defect type and the defect location.

In at least one embodiment, when it is detected that the meal box has a defect, a meal box pick-out instruction may be generated according to the recognized defect type, and transmitted to the user terminal, to instruct a robot arm of the user terminal to pick out the meal box, so as to screen out the meal box having the defect. The plastic meal box may also be picked out according to the defect type, such that the staff can handle different types of meal box having the defect. For example, the meal box having the scratch may be remediated and reused.

In at least one embodiment, correction information of a result of the defect recognition of the image of the meal box may be obtained, new defect detection samples may be generated according to the correction information, and the defect detection model can be updated according to the new defect detection samples.

In the embodiment, data such as the image of the meal box, the defect detection result and the response behavior may be stored in a database, after the system is running for a period of time, accuracy of the defect detection and positioning can be checked based on the information of the database, and the database can be updated, and the defect detection model can be retrained, so as to improve the defect detection accuracy. Alternatively, correction information of the result of the defect recognition of the image of the meal box fed back by the staff or the detecting device may be obtained and stored in the database, and new defect detection samples may be generated based on the images of the meal box corresponding to the correction information extracted from the database, and the defect detection model can be updated according to the new defect detection samples.

With the technical solution of embodiments of the present disclosure, the detection request including the image of the meal box sent by the user terminal is received, and defect recognition is performed based on the image of the meal box and the defect detection model in response to the detection request. The image of the meal box may be obtained by the image acquirer, the image acquirer may acquire the image of the meal box on the production line in real time, and the detection request may be generated based on the image of the meal box, and transmitted to the server. By detecting the image of the meal box obtained in real time, the defect detection of the meal box on the production line can be realized visually and automatically, and the manual detection of the quality of the meal box can be avoided, such that the efficiency and accuracy of defect detection of the meal box can be improved, and automaticity and expandability of the quality detection of the meal box can be improved.

Embodiment 3

Figure 3:
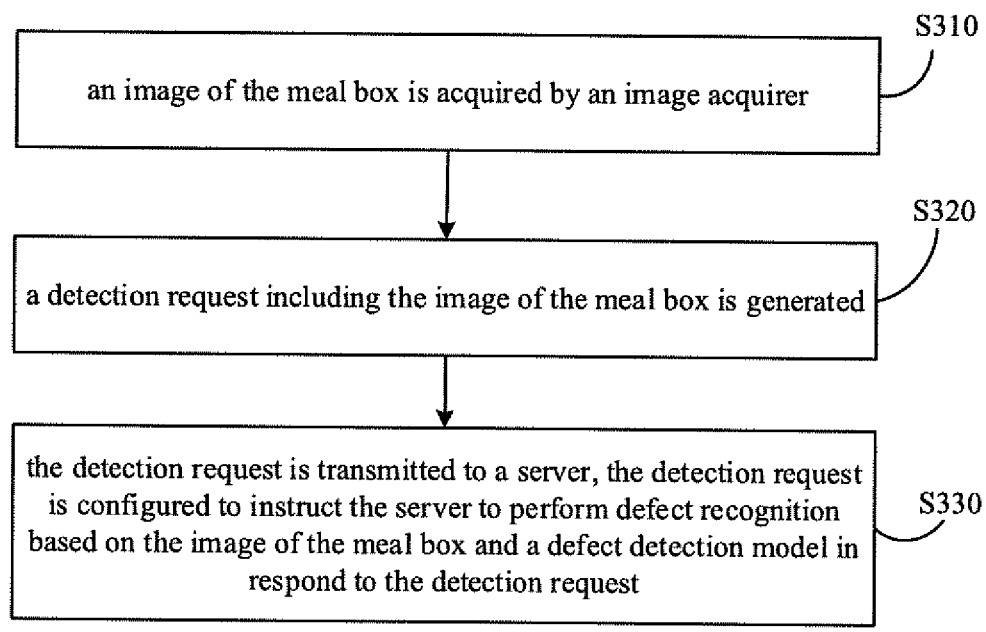
FIG. 3 is a flow chart of a method for detecting defect of a meal box according to Embodiment 3 of the present disclosure.

FIG. 3 is a flow chart of a method for detecting defect of a meal box according to Embodiment 3 of the present disclosure. The embodiment may be applicable to cases of quality detection of the meal box. The method may be applicable to a user terminal and can be executed by a device for detecting defect of a meal box. The method may include the followings.

At block S310, an image of the meal box is acquired by an image acquirer.

In the embodiment, the image acquirer may be a device capable of acquiring images, such as a camera. A high-precision image acquisition camera may be adopted for high-precision image acquisition, and by adjusting shooting parameters such as the shooting angle, auxiliary light, filter, scope and focal length, the image of the production line of the meal box can be acquired, such that the image of the meal box can be acquired.

In an embodiment, in order to improve the acquisition accuracy of the image of the meal box, the image acquirer may acquire the image at a corresponding frequency according to the running speed of the production line. There may be one or more image acquirers, and the posture of the image acquirer can be adjusted according to the shooting requirements. Correspondingly, according to the production environment and the detection requirement, at least one image of the meal box may be acquired in one image acquisition process, and the acquired meal box image may include the imaging results of the meal box at different viewing angles, thereby providing image basis for meal box detection.

At block S320, a detection request including the image of the meal box is generated.

In an embodiment of the present disclosure, one meal box image of the same detection target may be separately received, or multiple multi-view meal box images of the same detection target may be received simultaneously, thereby generating the detection request of the detection target according to the received meal box image.

At block S330, the detection request is transmitted to a server, the detection request is configured to instruct the server to perform defect recognition based on the image of the meal box and a defect detection model in response to the detection request.

In an embodiment of the present disclosure, there may be one or more servers. The same defect detection model may be deployed in different servers, and the defect detection model can be configured for detect defection of the image of the meal box. The user terminal may perform macro scheduling according to load information of each server, and determine a target server that detects the image of the meal box in real time, thereby balancing the defect detection tasks among the multiple servers. In addition, when there are multiple servers, defect detection models with different detection functions may be deployed in the multiple different servers, and the different defect detection models can be configured to detect defect of the images of the meal boxes in different generation environments. Correspondingly, a console may perform macro scheduling according to the deployment condition of the defect detection model and the load information of each server, and determine the target server capable of detecting the image of the meal box in real time by initially identifying conditions such as the shape of the meal box in the image of the meal box, the production environment and the manufacturer requirement, such that the image of the meal box can be detected in a targeted manner. The console may send the detection request to the target server to trigger defect detection on the image of the meal box.

With the technical solution of embodiments of the present disclosure, the image of the meal box to be detected is acquired by acquiring images of the meal box production line in real time using the image acquirer, the detection request is generated according to the image of the meal box, and transmitted to the server, to cause the server to perform defect recognition on the image of the meal box based on the defect detection model. By generating the detection request based on the image acquired in real time, and transmitting the detection request to the server to trigger the sever to perform detect recognition on the meal box in the image of the meal box based on the defect detection model, the defect detection of the meal box on the production line can be realized visually and automatically, and the manual detection of the quality of the meal box can be avoided, such that the efficiency and accuracy of defect detection of the meal box can be improved, and automaticity and expandability of the quality detection of the meal box can be improved.

Embodiment 4

Figure 4:
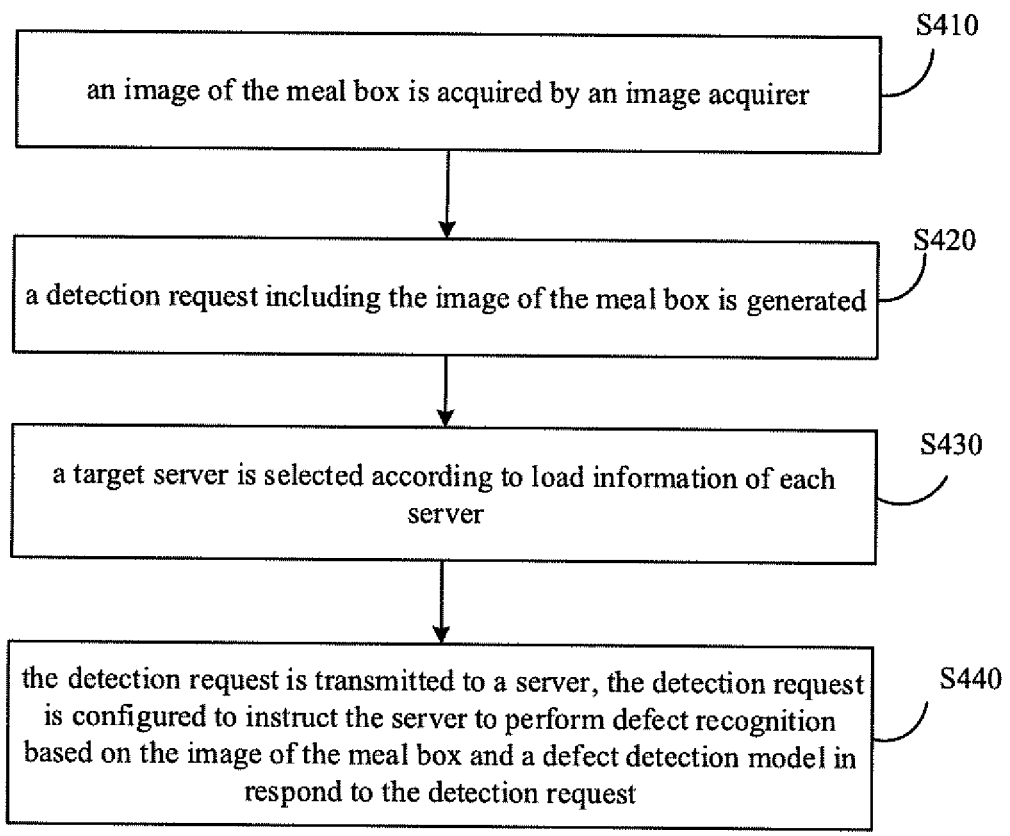
FIG. 4 is a flow chart of a method for detecting defect of a meal box according to Embodiment 4 of the present disclosure.

On the basis of embodiment 3, the present disclose further provide a method for detecting defect of a meal box according to an alternative embodiment. In the embodiment, a suitable target server can be selected to perform defect detection on the meal box. FIG. 4 is a flow chart of a method for detecting defect of a meal box according to Embodiment 4 of the present disclosure. As shown in FIG. 4, the method may include the followings.

At block S410, an image of the meal box is acquired by an image acquirer.

In the embodiment, the image acquirer may be a device capable of acquiring images, such as a camera. A high-precision image acquisition camera may be adopted for high-precision image acquisition, and by adjusting shooting parameters such as the shooting angle, auxiliary light, filter, scope and focal length, the image of the production line of the meal box can be acquired, such that the image of the meal box can be acquired.

In the embodiment, in order to improve the acquisition accuracy of the image of the meal box, the image acquirer may acquire the image at a corresponding frequency according to the running speed of the production line. There may be one or more image acquirers, and the posture of the image acquirer can be adjusted according to the shooting requirements. Correspondingly, according to the production environment and the detection requirement, at least one meal box image may be acquired in one image acquisition process, and the acquired meal box image may include the imaging results of the meal box at different viewing angles, thereby providing image basis for meal box detection.

At block S420, a detection request including the image of the meal box is generated.

In an embodiment of the present disclosure, one meal box image of the same detection target may be separately received, or multiple multi-view meal box images of the same detection target may be received simultaneously, thereby generating the detection request of the detection target according to the received meal box image.

At block S430, a target server is selected according to load information of each server.

In an embodiment of the present disclosure, there may be one or more servers. The same defect detection model may be deployed in different servers, and the defect detection model can be configured for detect defection of the image of the meal box. The user terminal may perform macro scheduling according to load information of each server, and determine a target server that detects the image of the meal box in real time, thereby balancing the defect detection tasks among the multiple servers. In addition, when there are multiple servers, defect detection models with different detection functions may be deployed in the multiple different servers, and the different defect detection models can be configured to detect defect of the images of the meal boxes in different generation environments. Correspondingly, a console may perform macro scheduling according to the deployment condition of the defect detection model and the load information of each server, and determine the target server capable of detecting the image of the meal box in real time by initially identifying conditions such as the shape of the meal box in the image of the meal box, the production environment and the manufacturer requirement, such that the image of the meal box can be detected in a targeted manner.

At block S440, the detection request is transmitted to a server, the detection request is configured to instruct the server to perform defect recognition based on the image of the meal box and a defect detection model in response to the detection request.

In the embodiment of the present disclosure, the target server may be a server determined by the user based on the load information and capable of performing the defect detection task on the image of the meal box, or a sever determined by the user based on the deployment condition of the defect detection model and satisfying the current meal box image detection requirement, or a server satisfying both cases. Further, the user terminal may transmit the detection request including the image of the meal box to the target server, such that the target server responds to the detection request by the defect detection model mounted thereon, and performs defect recognition on the image of the meal box, thereby improving the efficiency and accuracy of defect detection.

With the technical solution of embodiments of the present disclosure, the image of the meal box to be detected is acquired by acquiring images of the meal box production line in real time using the image acquirer, the detection request is generated according to the image of the meal box, and a target server for detecting the image of the meal box is selected according to the load information of each server, and the detection request is transmitted to the server, to cause the server to perform defect recognition on the image of the meal box based on the defect detection model mounted thereon. By generating the detection request based on the image acquired in real time, and transmitting the detection request to the server to trigger the defect detection model in the sever to perform detect recognition on the meal box in the image of the meal box, the defect detection of the meal box on the production line can be realized visually and automatically, and the manual detection of the quality of the meal box can be avoided, such that the efficiency and accuracy of defect detection of the meal box can be improved, and automaticity and expandability of the quality detection of the meal box can be improved.

Embodiment 5

Figure 5:
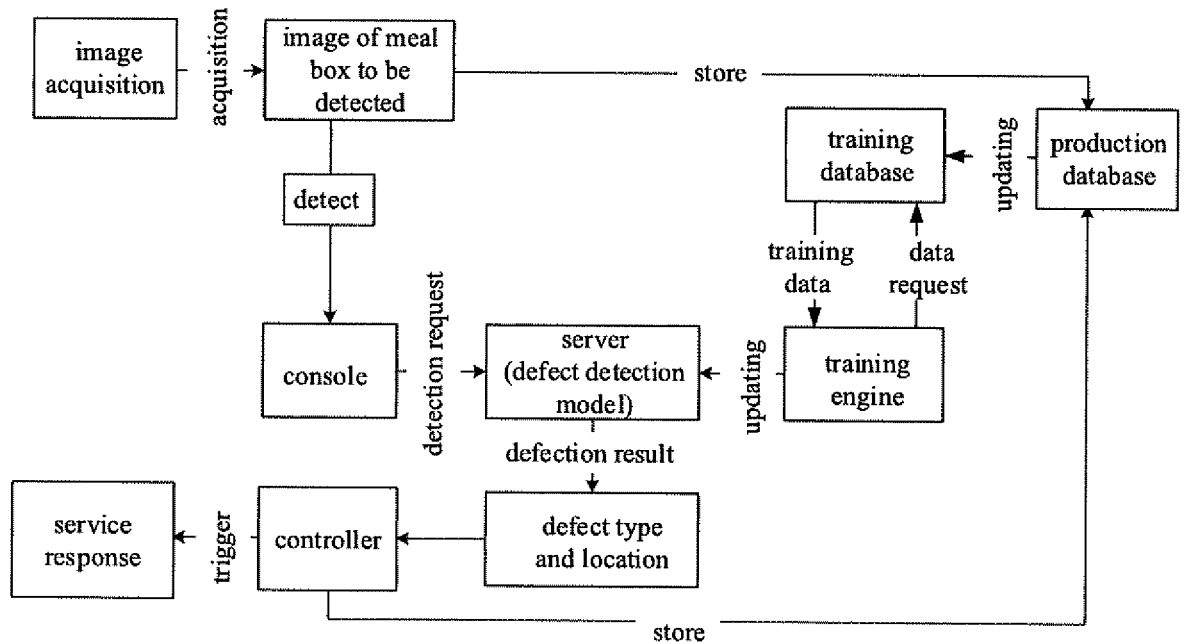
FIG. 5 is a flow chart of a method for detecting defect of a meal box according to Embodiment 5 of the present disclosure.

FIG. 5 is a flow chart of a method for detecting defect of a meal box according to Embodiment 5 of the present disclosure. As shown in FIG. 5, the image acquirer in the user terminal may acquire the image of the production line of the meal box in real time to obtain the image of the meal box to be detected, the console in the user terminal may generate the detection request based on the acquired image of the meal box, and transmit the detection request to the target server. The server may respond to the detection request based on the defect detection model to acquire the defect type and defect location in the image of the meal box, and generate a control instruction according to the detection result. Correspondingly, the controller in the user terminal may perform the service response according to a control instruction such as an alarm instruction and a pick-out indicator sent by the target server. Moreover, the image of the meal box, the detection result and the control instruction may be stored in the database, such that the defect detection model can be updated according to the data stored in the database, so as to generalize the defect detection model with dynamic expansion of the business.

In the embodiment of the present disclosure, through the cooperation between the server and the user terminal, control of the data acquisition, decision generation, image detection and production process are realized, the defect detection of the meal box on the production line can be realized visually and automatically, and the manual detection of the quality of the meal box can be avoided, such that the efficiency and accuracy of defect detection of the meal box can be improved, and automaticity and expandability of the quality detection of the meal box can be improved.

Embodiment 6

Figure 6:
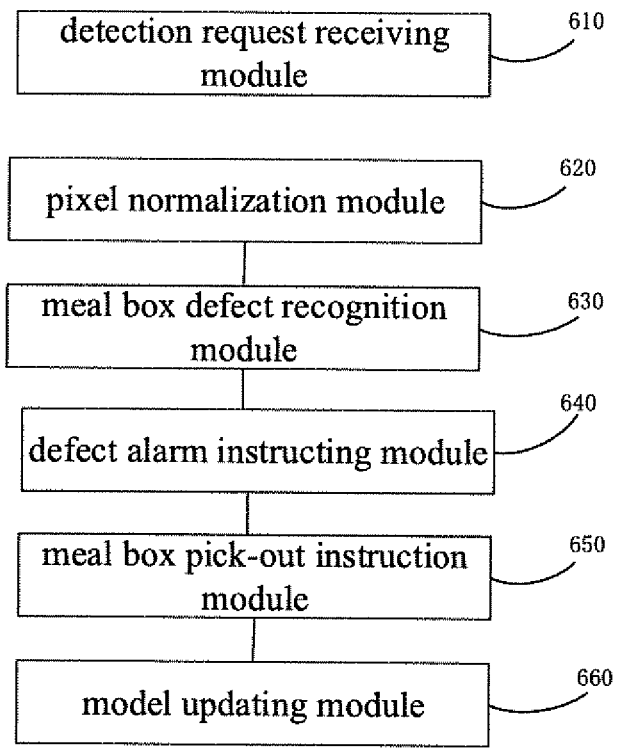
FIG. 6 is a block diagram of a device for detecting defect of a meal box according to Embodiment 6 of the present disclosure.

FIG. 6 is a block diagram of a device for detecting defect of a meal box according to Embodiment 6 of the present disclosure. The embodiment may be applicable to the cases of detecting the quality of the meal box. The device may be applied in the server, to implement the method for detecting defect of a meal box according to any embodiment of the present disclosure. The device may include a detection request receiving module 610, and a meal box defect recognition module 620.

The detection request receiving module 610 is configured to receive a detection request including an image of the meal box sent by a user terminal. The image of the meal box is obtained by an image acquirer of the user terminal. The meal box defect recognition module 620 is configured to perform defect recognition based on the image of the meal box and a defect detection model in response to the detection request.

In at least one embodiment, the defect detection model may be trained by acts of: training a neural network model based on sample meal box images and defect locations and defect types in the sample meal box images.

Furthermore, the device further includes a pixel normalization module 630. The pixel normalization module 630 is configured to determine an average value and a standard deviation of values of respective pixels in the image of the meal box; and perform normalization process on the values of the respective pixels in the image of the meal box according to the average value and the standard deviation.

Furthermore, the device further includes a defect alarm instructing module 640. The defect alarm instructing module 640 is configured to, after defect recognition is performed based on the image of the meal box and the defect detection model in response to the detection request, generate a defect alarm instruction according to a defect type and/or a defect location when it is detected based on the image of the meal box that the meal box has a defect, and transmit the defect alarm instruction to the user terminal.

Furthermore, the device further includes a meal box pick-out instruction module 650. The meal box pick-out instruction module 650 is configured to, after defect recognition is performed based on the image of the meal box and the defect detection model in response to the detection request, generate a meal box pick-out instruction according to a defect type when it is detected based on the image of the meal box that the meal box has a defect, and transmit the meal box pick-out instruction to the user terminal. The meal box pick-out instruction is configured to instruct a robot arm of the user terminal to pick out the meal box having the defect.

Furthermore, the device further includes a model updating module 660. The model updating module 660 is configured to obtain correct information of a result of the defect recognition, and generate new defect detection samples according to the correction information; and update the defect detection model based on the new defect detection samples.

With the technical solution of the embodiment of the present disclosure, through the cooperation of respective functional modules, the training of the defect detection model, the reception of the detection request, the defect detection of the image of the meal box, the behavior instruction of the detection of the meal box having the defect and the update of the defect detection model can be realized, the defect detection of the meal box on the production line can be realized visually and automatically, and the manual detection of the quality of the meal box can be avoided, such that the efficiency and accuracy of defect detection of the meal box can be improved, and automaticity and expandability of the quality detection of the meal box can be improved.

Embodiment 7

Figure 7:
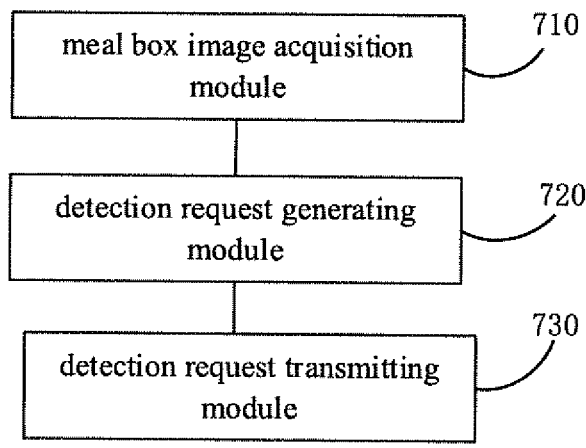
FIG. 7 is a block diagram of a device for detecting defect of a meal box according to Embodiment 7 of the present disclosure.

FIG. 7 is a block diagram of a device for detecting defect of a meal box according to Embodiment 7 of the present disclosure. The embodiment may be applicable to the cases of performing quality detection on the meal box. The device may be applied in the user terminal to implement the method for detecting defect of a meal box according to any embodiment of the present disclosure. The device may include a meal box image acquisition module 710, a detection request generating module 720, and a detection request transmitting module 730.

The meal box image acquisition module 710 is configured to acquire an image of the meal box by an image acquirer. The detection request generating module 720 is configured to generate a detection request including the image of the meal box. The detection request transmitting module 730 is configured to transmit the detection request to a server. The detection request is configured to instruct the server to perform defect recognition based on the image of the meal box and a defect detection model in response to the detection request.

In at least one embodiment, the detection request transmitting module 730 includes a server selection unit and a detection request transmitting unit. The server selection unit is configured to select a target server according to load information of each server. The detection request transmitting unit is configured to transmit the detection request to the target server.

With the technical solution of the embodiment of the present disclosure, through the cooperation of respective functional modules, the training of the defect detection model, the reception of the detection request, the defect detection of the image of the meal box, the behavior instruction of the detection of the meal box having the defect and the update of the defect detection model can be realized, the defect detection of the meal box on the production line can be realized visually and automatically, and the manual detection of the quality of the meal box can be avoided, such that the efficiency and accuracy of defect detection of the meal box can be improved, and automaticity and expandability of the quality detection of the meal box can be improved.

Embodiment 8

Figure 8:
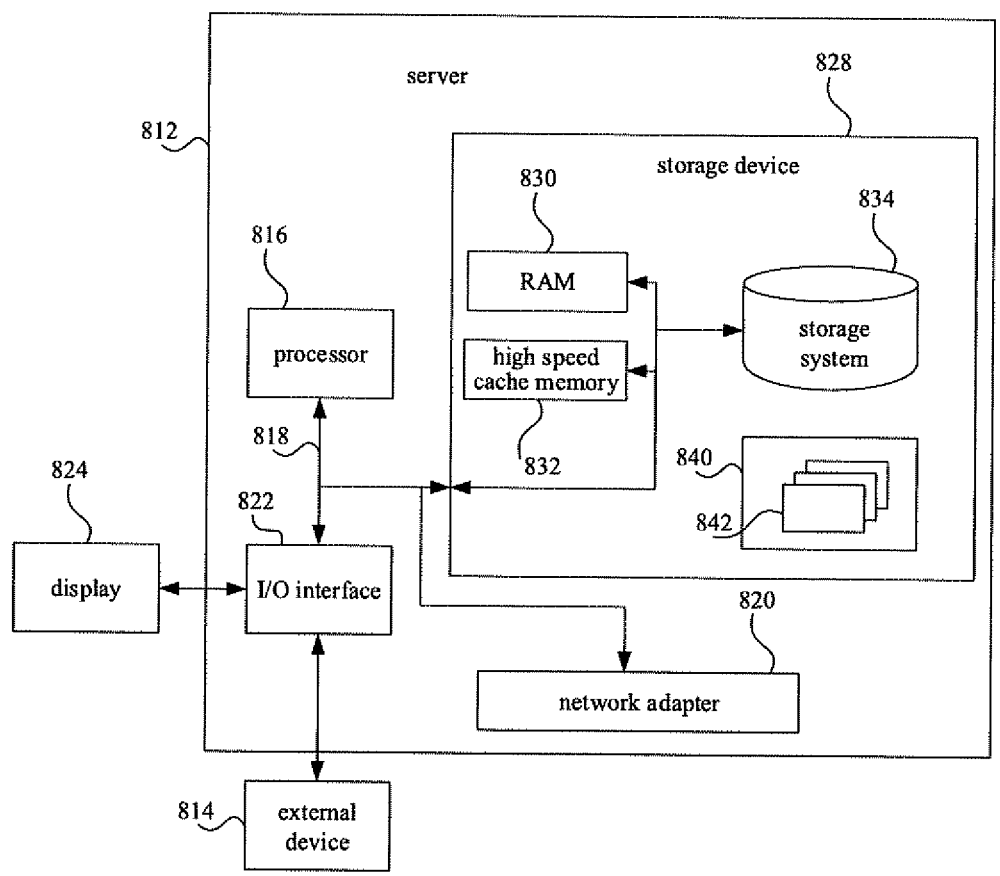
FIG. 8 is a block diagram of a server according to Embodiment 8 of the present disclosure.

FIG. 8 is a schematic diagram of a server according to Embodiment 8 of the present disclosure. FIG. 8 illustrates a block diagram of a server 812 suitable for implementing embodiments of the present disclosure. The server 812 shown in FIG. 8 is merely an example, and should not impose any limitation to the functions and scopes of embodiments of the present disclosure.

As shown in FIG. 8, the server 812 may be embodied in the form of a general-purpose computing device. The components of the server 812 may include, but are not limited to, one or more processors 816, a storage device 828, and a bus 818 that connects different components (including the storage device 828 and the processor 816).

The bus 818 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The server 812 typically includes a variety of computer system readable media. These media may be any available media accessible by the server 812, including volatile and non-volatile media, removable and non-removable media.

The storage device 828 may include a computer system readable medium in the form of volatile memory, such as a random-access memory (hereinafter referred to as RAM) 830 and/or a high-speed cache memory 832. The server 812 may further include other removable or non-removable, volatile or non-volatile computer system storage medium. By way of example only, the storage system 834 may be configured to read and write non-removable and non-volatile magnetic media (not shown in FIG. 8, commonly referred to as a "hard drive"). Although not shown in FIG. 8, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), a digital video disc read only memory (hereinafter referred to as DVD-ROM) or other optical media can be provided. In these cases, each driver may be connected to the bus 818 via one or more data medium interfaces. The storage device 828 may include at least one program product. The program product has a set of (such as, at least one) program modules configured to perform the functions of various embodiments of the present disclosure.

A program/utility 840 having a set of (at least one) the program modules 842 may be stored in, for example, the storage device 828. The program module 842 may include, but is not limited to, an operating system, one or more application programs, other programs modules and program data. Each of these examples, or some combination thereof, may include an implementation of a network environment. The program module 842 is generally configured to perform functions and/or methods in embodiments of the present disclosure.

The server 812 may also communicate with one or more external devices 814 (e.g., a keyboard, a pointing device, a camera, a display 824). Furthermore, the server 812 may also communicate with one or more devices enabling a user to interact with the server 812 and/or other devices (such as a network card, a modem, etc.) enabling the server 812 to communicate with one or more servers. This communication can be performed via the input/output (I/O) interface 822. Also, the server 812 may communicate with one or more networks (such as a local area network (hereafter referred to as LAN), a wide area network (hereafter referred to as WAN) and/or a public network such as the Internet) through a network adapter 820. As shown in FIG. 8, the network adapter 820 communicates with other modules of the server 812 over the bus 818. It should be understood that, although not shown in FIG. 8, other hardware and/or software modules may be used in conjunction with the server 812, which include, but are not limited to, microcode, device drivers, redundant processing units, external disk drive arrays, RAID systems, tape drives, as well as data backup storage systems and the like.

The processor 816 is configured to execute various functional applications and data processing by running a program stored in the storage device 828, for example, to implement a method for detecting defect of a meal box according to embodiments of the present disclosure.

Embodiment 9

Figure 9:
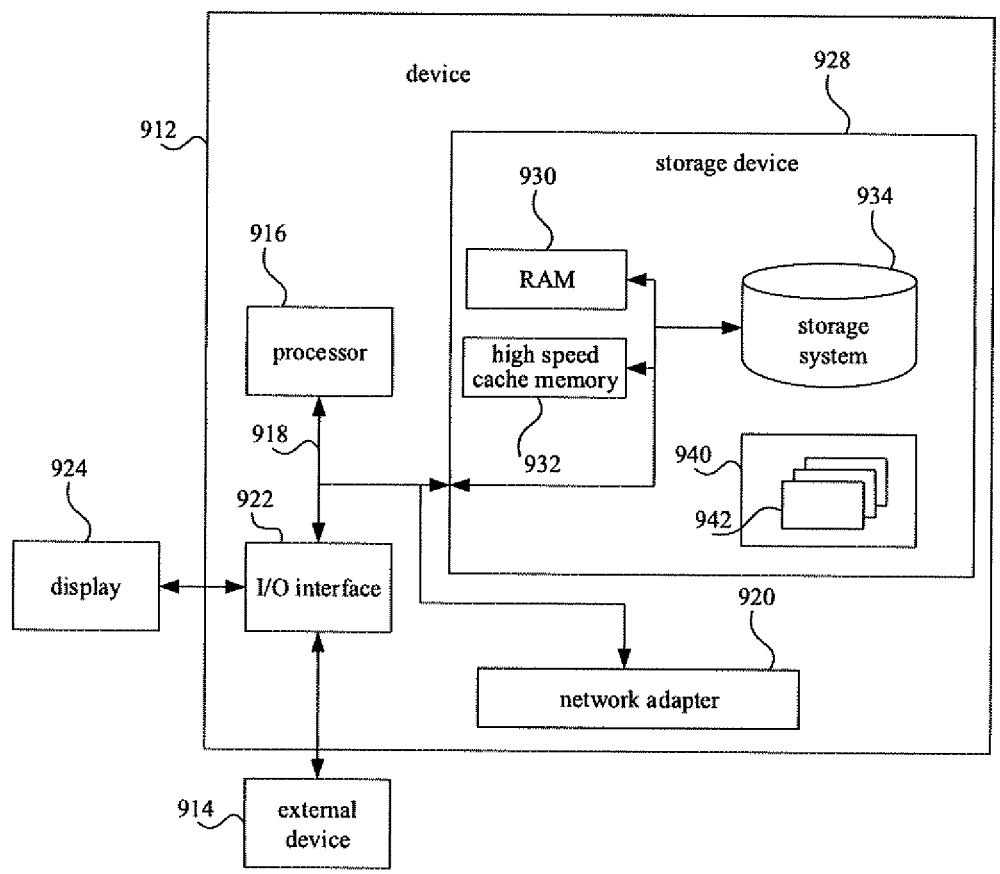
FIG. 9 is a block diagram of a device according to Embodiment 9 of the present disclosure.

FIG. 9 is a schematic diagram of a device according to Embodiment 9 of the present disclosure. FIG. 9 illustrates a block diagram of a device 912 suitable for implementing embodiments of the present disclosure. The device 912 shown in FIG. 9 is merely an example, and should not impose any limitation to the functions and scopes of embodiments of the present disclosure.

As shown in FIG. 9, the device 912 may be embodied in the form of a general-purpose computing device. The components of the device 912 may include, but are not limited to, one or more processors 916, a storage device 928, and a bus 918 that connects different components (including the storage device 928 and the processor 916).

The bus 918 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The device 912 typically includes a variety of computer system readable media. These media may be any available media accessible by the device 912, including volatile and non-volatile media, removable and non-removable media.

The storage device 928 may include a computer system readable medium in the form of volatile memory, such as a random-access memory (hereinafter referred to as RAM) 930 and/or a high-speed cache memory 932. The device 912 may further include other removable or non-removable, volatile or non-volatile computer system storage medium. By way of example only, the storage system 934 may be configured to read and write non-removable and non-volatile magnetic media (not shown in FIG. 9, commonly referred to as a "hard drive"). Although not shown in FIG. 9, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), a digital video disc read only memory (hereinafter referred to as DVD-ROM) or other optical media can be provided. In these cases, each driver may be connected to the bus 918 via one or more data medium interfaces. The storage device 928 may include at least one program product. The program product has a set of (such as, at least one) program modules configured to perform the functions of various embodiments of the present disclosure.

A program/utility 940 having a set of (at least one) the program modules 942 may be stored in, for example, the storage device 928. The program module 942 may include, but is not limited to, an operating system, one or more application programs, other programs modules and program data. Each of these examples, or some combination thereof, may include an implementation of a network environment. The program module 942 is generally configured to perform functions and/or methods in embodiments of the present disclosure.

The device 912 may also communicate with one or more external devices 914 (e.g., a keyboard, a pointing device, a camera, a display 924). Furthermore, the device 912 may also communicate with one or more devices enabling a user to interact with the device 912 and/or other devices (such as a network card, a modem, etc.) enabling the device 912 to communicate with one or more computer devices. This communication can be performed via the input/output (I/O) interface 922. Also, the device 912 may communicate with one or more networks (such as a local area network (hereafter referred to as LAN), a wide area network (hereafter referred to as WAN) and/or a public network such as the Internet) through a network adapter 920. As shown in FIG. 9, the network adapter 920 communicates with other modules of the device 912 over the bus 918. It should be understood that, although not shown in FIG. 9, other hardware and/or software modules may be used in conjunction with the device 912, which include, but are not limited to, microcode, device drivers, redundant processing units, external disk drive arrays, RAID systems, tape drives, as well as data backup storage systems and the like.

The processor 916 is configured to execute various functional applications and data processing by running a program stored in the storage device 928, for example, to implement a method for detecting defect of a meal box according to embodiments of the present disclosure.

Embodiment 10

Embodiments of the present disclosure further provides a computer readable storage medium having stored thereon a computer programs (or a computer executable instruction) that, when executed by a processor, causes the method for detecting defect of a meal box according to embodiments of the present disclosure to be implemented. The method includes: receiving a detection request including an image of the meal box sent by a user terminal, and performing defect recognition on the image of the meal box by a defect detection model in response to the detection request. The image of the meal box is obtained by an image acquirer of the user terminal.

Embodiments of the present disclosure further provides a computer readable storage medium having stored thereon a computer programs (or a computer executable instruction) that, when executed by a processor, causes the method for detecting defect of a meal box according to embodiments of the present disclosure to be implemented. The method includes: acquiring an image of the meal box by an image acquirer; generating a detection request including the image of the meal box; and transmitting the detection request to a server. The detection request is configured to instruct the server to perform defect recognition based on the image of the meal box and a defect detection model in response to the detection request.

The above non-transitory computer readable storage medium may adopt any combination of one or more computer readable medium(s). The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by or in connection with an instruction executed system, apparatus or device.

The computer readable signal medium may include a data signal propagating in baseband or as part of carrier wave, which carries computer readable program codes. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport programs used by or in connection with an instruction executed system, apparatus or device.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

The above are only the preferred embodiments of the present disclosure and the technical principles applied thereto. Those skilled in the art will appreciate that the present disclosure is not limited to the specific embodiments described herein, and that various modifications, changes and substitutions may be made without departing from the scope of the present disclosure. Although the present disclosure has been described in detail by the above embodiments, the present disclosure is not limited to the above embodiments, and other equivalent embodiments may be included without departing from the scope of the present disclosure, and the scope of the present disclosure is determined by the scope of the appended claims.

What is claimed is:

1. A method for detecting defect of a meal box, performed by a server, comprising:
   receiving a detection request comprising an image of the meal box sent by a user terminal, wherein the image of the meal box is obtained by an image acquirer of the user terminal; and
   performing defect recognition based on the image of the meal box and a defect detection model in response to the detection request;
   wherein after performing defect recognition based on the image of the meal box and the defect detection model in response to the detection request, the method further comprises:
   obtaining correction information of a defect type and defect location coordinates, and generating new defect detection samples according to the correction information, in which the new defect detection samples are samples with defects corrected by the correction information of the defect type and the defect location coordinates; and
   updating the defect detection model based on the new defect detection samples;
   wherein the defect detection model is trained by:
   training a neural network model based on sample meal box images and defect locations and defect types in the sample meal box images by using a mask region-based convolutional neural network (R-CNN) algorithm, and optimizing network model parameters by combining a loss of the mask R-CNN algorithm with a loss of a faster R-CNN;
   wherein the server is determined from a plurality of servers deployed with defect detection models of different detection functions by identifying a meal box shape and a production environment.

2. The method according to claim 1, wherein before performing defect recognition based on the image of the meal box and the defect detection model in response to the detection request, the method further comprises:
  determining an average value and a standard deviation of values of respective pixels in the image of the meal box; and
  performing normalization process on the values of the respective pixels in the image of the meal box according to the average value and the standard deviation.

3. The method according to claim 1, wherein after performing defect recognition based on the image of the meal box and the defect detection model in response to the detection request, the method further comprises:
  when it is detected based on the image of the meal box that the meal box has a defect, generating a defect alarm instruction according to a defect type and/or a defect location, and transmitting the defect alarm instruction to the user terminal.

4. The method according to claim 1, wherein after performing defect recognition based on the image of the meal box and the defect detection model in response to the detection request, the method further comprises:
  when it is detected based on the image of the meal box that the meal box has a defect, generating a meal box pick-out instruction according to a defect type, and transmitting the meal box pick-out instruction to the user terminal, wherein the meal box pick-out instruction is configured to instruct a robot arm of the user terminal to pick out the meal box having the defect.

5. A method for detecting defect of a meal box, comprising:
  acquiring an image of the meal box by an image acquirer;
  generating a detection request comprising the image of the meal box;
  determining a target server from a plurality of servers deployed with defect detection models of different detection functions by identifying a meal box shape and a production environment; and
  transmitting the detection request to the target server, wherein the detection request is configured to instruct the server to perform defect recognition based on the image of the meal box and a defect detection model in response to the detection request;
  wherein after performing defect recognition based on the image of the meal box and the defect detection model in response to the detection request, the method further comprises:
  obtaining correction information of a defect type and defect location coordinates, and generating new defect detection samples according to the correction information, in which the new defect detection samples are samples with defects corrected by the correction information of the defect type and the defect location coordinates; and
  updating the defect detection model based on the new defect detection samples;
  wherein the defect detection model is trained by:
  training a neural network model based on sample meal box images and defect locations and defect types in the sample meal box images by using a mask region-based convolutional neural network (R-CNN) algorithm, and optimizing network model parameters by combining a loss of the mask R-CNN algorithm with a loss of a faster R-CNN.

6. The method according to claim 5, wherein determining the target server further comprises:
  selecting a target server capable of performing the defect recognition on the image of the meal box according to load information of each server.

7. The method according to claim 5, wherein determining the target server further comprises:
  selecting a target sever satisfying a current detection requirement of the image of the meal box based on a deployment condition of the plurality of defect detection models.

8. The method according to claim 5, wherein acquiring the image of the meal box by the image acquirer comprises:
  acquiring images of the meal box at different viewing angles.

9. A user terminal, comprising:
  an image acquirer, configured to acquire an image of the meal box;
  a console, configured to generate a detection request comprising the image of the meal box, determine a target server from a plurality of servers deployed with defect detection models of different detection functions by identifying a meal box shape and a production environment; and transmit the detection request to the target server, wherein the detection request is configured to instruct the server to perform defect recognition based on the image of the meal box and a defect detection model in response to the detection request;
  wherein after performing defect recognition based on the image of the meal box and the defect detection model in response to the detection request, the method further comprises:
  obtaining correction information of a defect type and defect location coordinates, and generating new defect detection samples according to the correction information, in which the new defect detection samples are samples with defects corrected by the correction information of the defect type and the defect location coordinates; and
  updating the defect detection model based on the new defect detection samples;
  wherein the defect detection model is trained by:
  training a neural network model based on sample meal box images and defect locations and defect types in the sample meal box images by using a mask region-based convolutional neural network (R-CNN) algorithm, and optimizing network model parameters by combining a loss of the mask R-CNN algorithm with a loss of a faster R-CNN.

10. The user terminal according to claim 9, further comprising:
  a controller, configured to receive a defect alarm instruction from the server, and to perform a service response, wherein the defect alarm instruction is generated by the server according to a defect type and/or a defect location when it is detected based on the image of the meal box that the meal box has a defect.

11. The user terminal according to claim 10, wherein the user terminal further comprises a robot arm,
  the controller is configured to:
  receive a meal box pick-out instruction from the server, wherein the meal box pick-out instruction is generated by the server according to a defect type when it is detected based on the image of the meal box that the meal box has a defect; and
  control the robot arm to pick out the meal box having the defect.

12. The user terminal according to claim 9, wherein the image acquirer comprises one or more cameras.

13. The user terminal according to claim 12, wherein the image acquirer comprises one camera, and the one camera is configured to acquire a plurality of images of the meal box at a corresponding frequency according to a running speed of a production line of the meal box, and a viewing angle of the one camera is different in each image acquisition process.

14. The user terminal according to claim 12, wherein the image acquirer comprises a plurality of cameras, and the plurality of cameras are configured to acquire a plurality of images of the meal box at different viewing angles.

\* \* \* \* \*